US012808396B2

(12) United States Patent
Bermejo et al.

(10) Patent No.: US 12,808,396 B2
(45) Date of Patent: Nov. 24, 2026

(54) QUICK CONNECTOR COUPLING AN OFFSHORE FLOATING STRUCTURE TO A PRE-LAID MOORING SYSTEM AND A METHOD THEREFOR

(71) Applicant: EXPONENTIAL RENEWABLES, S.L., Barcelona (ES)

(72) Inventors: Carlos Casanovas Bermejo, Barcelona (ES); Santiago Canedo Pardo, Barcelona (ES); Pau Alcoverro Colom, Barcelona (ES)

(73) Assignee: EXPONENTIAL RENEWABLES, S.L., Barcelona (ES)

(*) Notice: Subject to any disclaimer, the term of this patent is extended or adjusted under 35 U.S.C. 154(b) by 264 days.

(21) Appl. No.: 18/708,073

(22) PCT Filed: Nov. 7, 2022

(86) PCT No.: PCT/IB2022/060681
§ 371 (c)(1),
(2) Date: May 7, 2024

(87) PCT Pub. No.: WO2023/084375
PCT Pub. Date: May 19, 2023

(65) Prior Publication Data
US 2025/0010950 A1 Jan. 9, 2025

(30) Foreign Application Priority Data
Nov. 10, 2021 (EP) .................................... 21383017

(51) Int. Cl.
*F16B 7/02* (2006.01)
*B63B 21/04* (2006.01)
*B63B 21/00* (2006.01)

(52) U.S. Cl.
CPC .............. *F16B 7/025* (2013.01); *B63B 21/04* (2013.01); *B63B 2021/004* (2013.01)

(58) Field of Classification Search
CPC ................................................ B63B 2021/004
See application file for complete search history.

(56) References Cited

U.S. PATENT DOCUMENTS 1,825,774 A * 10/1931 Boynton ................ E21B 33/04 285/123.3
4,441,740 A * 4/1984 Cowan .................. E21B 33/038 285/920

(Continued)

FOREIGN PATENT DOCUMENTS

EP 1567727 B1 7/2010
EP 3642479 B1 3/2021

(Continued)

*Primary Examiner* — Matthew R McMahon
(74) *Attorney, Agent, or Firm* — IP KONCEPTS LLC; Franco S. De Liguori

(57) ABSTRACT

The quick connector coupling an offshore floating structure to a pre-laid mooring system comprises a base structure (6) coupled to an upper body (2) of the offshore floating structure, a mooring interface (13) attached to a lower body (3) of the pre-laid mooring system, and a locking mechanism comprising a grooved surface (16) formed in the mooring interface (13), locking claws (10) movably mounted on the base structure (6), and a fluid-dynamic device associated to the base structure (6) and operatively connected to move the locking claws (10) between a release position in which the locking claws (10) are withdrawn from the grooved surface (16) of the mooring interface (13) and a lock position in which the locking claws (10) are meshed with the grooved surface (16) of the mooring interface (13).

19 Claims, 8 Drawing Sheets

(56) References Cited

U.S. PATENT DOCUMENTS

| | | | | |
|---|---|---|---|---|
| 4,441,742 | A * | 4/1984 | Owens, III | E21B 33/038 285/920 |
| 5,356,321 | A | 10/1994 | Boatman | |
| 5,363,789 | A | 11/1994 | Laurie et al. | |
| 6,294,844 | B1 | 9/2001 | Lagerwey | |
| 6,609,734 | B1 | 8/2003 | Baugh | |
| 8,720,574 | B2 * | 5/2014 | Cuiper | E21B 33/038 285/308 |
| 9,650,110 | B1 * | 5/2017 | Lindblade | B63B 21/00 |

FOREIGN PATENT DOCUMENTS

| | | | | |
|---|---|---|---|---|
| FR | 2851321 | A1 * | 8/2004 | F16B 7/025 |
| WO | WO 2007127531 | A2 | 11/2007 | |
| WO | WO 2010071433 | A2 | 6/2010 | |
| WO | WO 2010099269 | A1 | 9/2010 | |
| WO | WO-2017123097 | A1 * | 7/2017 | B63B 21/50 |
| WO | WO 2017074813 | A1 | 5/2019 | |

* cited by examiner

QUICK CONNECTOR COUPLING AN OFFSHORE FLOATING STRUCTURE TO A PRE-LAID MOORING SYSTEM AND A METHOD THEREFOR

TECHNICAL FIELD

The present invention concerns to a quick connector for coupling an offshore floating structure to a pre-laid mooring system and belongs to the field of floating offshore structures and more specifically to the field of offshore floating wind turbines, wave machines, and tidal stream turbines.

The present invention further concerns to a method for coupling an offshore floating structure to a pre-laid mooring system by using a quick connector.

PRIOR ART

Conventionally, floating offshore platforms, and in particular, floating wind turbine platforms are linked to the seabed by means of a plurality of mooring lines which limit the displacement and rotation of the structure. That is to provide station-keeping, required for the wind turbine to operate and maintain position. Also, conventionally, floating platforms with the wind turbines are transported to the installation site completely assembled, towed by tugboats. However, installation and tensioning of mooring lines requires the use of multiple vessels and can be complicated to execute, requiring the use of specialized teams, vessels, and good weather conditions. It is expected that floating wind turbine platforms may need to be towed to port multiple times during their 20-25-year lifetime to conduct maintenance on the turbine or the platform itself. Hence, it is highly desirable to have a means for safely and quickly disconnect and reconnect the platform.

The present invention therefore seeks to provide an apparatus for the connection and disconnection of the offshore floating platform to a pre-laid mooring system that makes this operation fast, easy, and not requiring complex planning such as multiple specialized vessels.

Document U.S. Pat. No. 6,294,844 describes an offshore structure consisting of a frame and multiple wind turbines, installed on a floating platform connected to a vertical axis in a way that allows weathervaning of the structure. The axis is kept stationary by means of an anchoring system.

Its connection with the frame of the rotatable structure is designed to support it in multiple planes, keeping the wind turbines upright and steady.

In some other designs the floating structure is rotatable around a single mooring point, as it is described in the case of document EP3642479B1 system. This invention further comprises means to disconnect the floating platform from a permanently moored structure by moving the lower and upper body with respect to each other using a semi-submersible barge. Furthermore, centring means consisting of a cone and a counter-cone pair guide the connection-disconnection manoeuvre.

In the last decades, many quick connectors were developed in the oil and gas offshore extraction industry to facilitate connection and disconnection of a vessel from a semi-submerged buoy. The buoy is conventionally anchored to the seabed, features a plurality of risers and drilling equipment, and is capable of withstanding sea waves and currents acting on the vessel so it can be kept in place even without a dynamic positioning system. The quick connector is usually located in the vessel below any kind of yaw system which allows the free rotation of the vessel around the buoy, allowing the alignment of the vessel to the direction of the wind.

Document U.S. Pat. No. 5,356,321 document discloses a disconnectable mooring system for production vessels. It includes a turret having a yaw system with a top bearing and a bottom bearing, and a quick connector progressing below the ship so it can weathervane and align to the wind, currents, or wave directions, and be driven to the harbour when fierce storms occur, or ice floes are present. The quick connector consists of a plurality of bear locks which are forced to interfere in an annular cavity machined on the buoy top interface by means of a collet driven by hydraulic cylinders.

Similarly, Document U.S. Pat. No. 5,363,789 describes a disconnectable mooring system that features a receiving member rotatably connected to the floating structure. The structural connection between the mooring buoy and the receiving member is made using a ring-shaped actuation member that engages circumferentially arranged latching members. Centring means used only allow the receiving member and mooring buoy to connect in a certain rotational position.

Document WO2007127531A2 describes a mooring method that allows a vessel to weathervane about a submerged buoy. The bearing assembly of the buoy has an inner hub coupled to an outer ring fixed to the buoy. The structural connector attached to the vessel is arranged to be releasably connectable to the inner hub. The connector comprises a plurality of collet segments which engage the inner hub to dog it securely to the connector. The radial load involved in the process of receiving the inner hub is transmitted between the vessel and the buoy through a radial bushing seat defined by the perimeter of a circular recess formed in the buoy.

Document EP1567727B1 relates to a method of mounting wind turbines, wave machines and tidal stream turbines offshore, using mechanical guiding which only requires self-propelled barges. The method comprises the use of a socket and an intermediate supporting part which provide an internal guiding surface for the conically shaped end part of a structure being installed. The structure is initially held in the reclined position by clamps attached to a barge. Then, the end part of the structure is led into the mounting socket using the guiding wire, lowered by adjusting removable alignment means until the geometrical alignment of the mounting surfaces is achieved, and released out of the clamps. Grout injection is used afterwards to secure the mounting.

Document U.S. Pat. No. 6,609,734 discloses a connector used to connect pressure vessels that features toroidal members sliding parallel to motion of locking segments. One of the toroidal members, an actuating torus, engages an inner piston, moving it down and thus rocking a plurality of circumferentially arranged locking segments onto the hubs on the surface of the pressure vessel.

SUMMARY OF THE INVENTION

The present invention comprises a quick connector configured to couple an upper body of an offshore floating structure to a lower body of a pre-laid mooring system. In some embodiments, the offshore floating structure may be a weathervaning floating offshore wind turbine (FOWT) platform, for example, and the pre-laid mooring system may be a Tension Leg Platform (TLP) type, for example, but the device could find use in other type of floating systems. The offshore floating structure and the pre-laid mooring system may be arranged aligned along a longitudinal axis. The quick connector may be configured to couple (preferably, coaxially couple) the offshore floating structure to the pre-laid mooring structure along the longitudinal axis. The longitudinal axis may be a geometrical longitudinal axis, not corresponding to a physical part of the quick connector.

The quick connector comprises a base structure configured to be coupled to an upper body of an offshore floating structure, a mooring interface configured to be attached to a lower body of a pre-laid mooring system, and a locking mechanism fluid-dynamically (hydraulically or pneumatically) actuated configured to couple and decouple the base structure from the mooring interface.

Preferably, the mooring interface is shaped as an outer female member designed to receive the base structure of the quick connector as an inner male member and matches it geometrically. However, the technical solution provided by the invention may also be applicable for configurations in which the mooring interface is configured as an inner male member and the base structure is configured as an outer male member. The base structure of the quick connector may be attached to a floating upper body of a FOWT platform or other type of offshore platform with the aim of securing it to the mooring system. The base structure and the mooring interface are configured to be connected (e.g., coaxially connected) to each other along a longitudinal axis. In preferred embodiments, the longitudinal axis, in an operative position, is configured as a vertical axis.

Once the base structure of the quick connector is guided until connection with the mooring interface is achieved, a plurality of peripherally or perimetrically (e.g., circumferentially) arranged locking claws (i.e., the locking claws may be arranged at a radial distance from the longitudinal axis) embedded into the base structure are aligned with a grooved surface of a ring-shaped portion of the mooring interface. In preferred embodiments, the grooved surface may be configured as an inner grooved surface of the ring-shaped portion of the mooring interface (e.g., the grooved surface may be configured as an inner surface of the ring-shaped portion).

Multiple hydraulic or pneumatic pistons may be mounted on the base structure and operatively connected to move the locking claws between a release position in which the locking claws are withdrawn (i.e., disconnected) from the grooved surface of the mooring interface and a lock position in which the locking claws are meshed (i.e., connected) with the grooved surface of the mooring interface.

In one embodiment, each locking claw may be included in a locking assembly guided to slide perpendicular, or at least partially perpendicular, to the longitudinal axis. In the context of the current invention, “partially perpendicular” must be interpreted as representing a movement in which a first component of the movement is perpendicular to the longitudinal axis, and a second component of the movement is parallel to the longitudinal axis, wherein “mainly (or mostly) perpendicular” is interpreted as a partially perpendicular movement in which the movement is predominantly perpendicular (i.e., the parallel component of the movement is smaller than the perpendicular component). A plurality of wedges may be mounted to the base structure to move parallel (or partially parallel or mainly parallel; wherein the descriptions of “partially parallel” and “mainly parallel” are based on the descriptions of “partially perpendicular” and “mainly perpendicular” provided above) to the longitudinal axis and the hydraulic or pneumatic pistons may be operatively connected to lower down and raise up the wedges. Each wedge may have wedge surfaces configured and arranged to interact with inclined surfaces of the locking assembly to move outwards and inwards the locking claws between the lock and release positions.

According to some embodiments, each wedge may comprise at least one expansion wedge surface and at least one retraction wedge surface, wherein each locking assembly may comprise at least one expansion inclined surface and at least one retraction inclined surface. The at least one expansion wedge surface may be configured and arranged to interact with the at least one expansion inclined surface of the locking assembly, and the at least one retraction wedge surface may be configured and arranged to interact with the at least one retraction inclined surface so as to move the locking claws outwards and inwards.

In some embodiments, each wedge may be configured as a part comprising a main wedge body and a base plate. The base plate may be configured to protrude laterally from the main wedge body, thereby forming one or two lateral wings. The main wedge body may be arranged in a central position with respect to two lateral wings, or may be arranged laterally (if there is only one lateral wing). The expansion and retraction wedge surfaces may be respectively configured as opposing faces of the base plate, wherein preferably the expansion wedge surfaces are parallel to the expansion wedge surfaces. The main wedge body may further comprise a guide surface arranged at an angle to the expansion and retraction wedge surfaces, wherein said guide surface may be configured such that, when the wedge slides into the inclined passage, the guide surface is pressed against a surface of the base structure, so that the pressing force is transmitted from the wedge to the locking claw to move the locking claw towards the grooved surface.

The expansion and retraction inclined surfaces of each locking assembly may be configured to form an inclined passage configured to receive the base plate of a respective wedge. The expansion and retraction inclined surfaces may be arranged mutually parallel. The inclined passage is also referred to as a slot (although lateral surfaces arranged to connect the respective expansion and retraction inclined surfaces are optional). The inclined passage may be open (i.e., it is not closed, but has an opening) on the retraction inclined surface, thereby allowing the movement of the main wedge body when the base plate slides within the inclined passage and limiting lateral displacement (i.e., in a direction transversal to the direction along which the base plate slides within the inclined passage) of the main wedge body when the base plate slides within the inclined passage.

According to some embodiments, the intermediate actuator may comprise one or more intermediate elastic elements. The one or more intermediate elastic elements may be at least partially housed in a respective cavity of the corresponding locking claw. The intermediate actuator may comprise at least one of the one or more expansion inclined surfaces of the locking assembly, wherein said at least one expansion inclined surface may be configured as a protruding expansion inclined surface. The at least one protruding expansion inclined surface may be configured to protrude from the cavity to come into contact with the at least one expansion wedge surface of the wedge. Thus, the at least one protruding expansion wedge surface may be configured to protrude into the inclined passage such that, when a wedge (or the base plate of a wedge) is inserted into the inclined passage, the expansion wedge surface of the wedge comes into contact with the protruding expansion inclined surface, therefore pushing the respective locking claw towards the respective grooved surface.

The intermediate actuators may be arranged with an angle of inclination with respect to a direction perpendicular to the longitudinal axis. The angle of inclination may be configured such that, when the intermediate actuator receives a compression force from the respective wedge, then intermediate actuator transmits a primary part (i.e., more than the 50% of the force) of the force in a direction perpendicular to the longitudinal axis and secondary part (i.e., less than the 50% of the force) of the force in a direction parallel to the longitudinal axis according to (i.e., aligned with) the movement of the wedge. The angle of inclination is an optional feature that ensures that the locking claws engage with the respective grooved surface in the locking position, while simultaneously a transversal force (i.e., parallel to the longitudinal axis) is provided, thereby generating a pretensioning force in the connection between the base structure and the mooring interface. Further, the transversal force helps to connect the locking ribs of the locking claws with the grooved surface. This last effect is especially important when the locking ribs are configured in a tooth-shaped pattern, and is even more especially important when said tooth-shaped pattern has an angle leaning towards a direction contrary to a direction of connection of the base structure with the mooring interface along the longitudinal axis. The angle of inclination may be in the range 5 to 25 degrees, preferably 10 to 20 degrees and, more preferably, 15 to 18 degrees. In other embodiments, the intermediate actuators may be arranged perpendicular to the longitudinal axis.

The protruding expansion inclined surface of the intermediate actuator may be arranged on the at least one intermediate elastic element. Optionally, the intermediate actuator may further comprise a push element connected to an end of the at least one intermediate elastic element, such that the protruding expansion inclined surface of the intermediate actuator is arranged on the push element. In preferred embodiments, the push element may be configured to have a wider cross-section area than the at least one intermediate elastic element. The cavity of the respective locking claw in which the intermediate actuator is housed comprises a lateral wall surrounding the cavity. Preferably, at least a part of said lateral wall may be configured to provide sliding contact with the push element and to remain separated from the intermediate elastic element. This may be achieved by providing a straight wall dimension to receive the wider cross-section of the push element. Thereby, a space is created between the intermediate elastic element and the part of the lateral wall configured to provide sliding contact with the push element, such that the friction between the cavity the lateral wall of the cavity and the intermediate elastic element is notably reduced.

To secure the alignment, the plurality of wedges may be, for example, peripherally or perimetrically (e.g., circumferentially) arranged on an optional actuator ring that is lowered down and raised up by means of the multiple hydraulic or pneumatic pistons which may have a first end connected to an optional collet arranged on top of the base structure and a second end connected to the actuator ring. In a coupling manoeuvre according to some embodiments, the actuator ring may be lowered down by the hydraulic or pneumatic pistons and each wedge may push out one of the corresponding locking claws to the lock position through the interaction with an intermediate actuator comprising one or more intermediate elastic elements, such as rubber mounts, of the locking assembly.

In the lock position, each claw is configured to press against the grooved surface of the mooring interface and is locked in place by its alignment with the grooves of the ring-shaped cavity. The intermediate elastic elements are located behind each locking claw and are used to ensure that the claws are pressed against the grooves with a known force, coming from the known stiffness of the intermediate elastic element, which remains preloaded once the coupling is engaged. This makes it so the locking force in the device is almost independent to manufacturing tolerance or in the presence of wear, which may otherwise lead to very large and difficult to estimate variations in the force exerted by each individual claw.

Decoupling manoeuvre is the exact same of the coupling manoeuvre described above but in reverse. In the decoupling manoeuvre, the hydraulic or pneumatic pistons are actuated to raise up the actuator ring thereby the wedges pull in the locking claws, preload on the intermediate elastic elements is released and thus the locking claws are moved to the release position and withdrawn from the grooved surface of the mooring interface. The base structure of the quick connector can be then taken out of the mooring interface attached to the mooring system and thereby the offshore floating structure is decoupled from the pre-laid mooring system.

In an alternative embodiment, the wedges may be configured and arranged so that the wedges push out the locking claws to the lock position when the actuator ring is raised up and the wedges pull in the locking claws to the release position when the actuator ring is lowered down.

In a further alternative embodiment, the locking claws may be guided with respect to the base structure to slide perpendicular (or at least partially perpendicular or mainly perpendicular) to the longitudinal axis, and an intermediate elastic element is interposed between each locking claw and the base structure. In this embodiment, the intermediate elastic elements are fluid-dynamically expansible and retractable and the fluid-dynamic device comprises a source of pressurized fluid, a valve arrangement and a fluid conduit. Each intermediate elastic element has an inner cavity which is in fluid communication with the source of pressurized fluid through the fluid conduit and through the valve arrangement.

With this construction, when pressurized fluid is injected into the inner cavity of the intermediate elastic element by the fluid-dynamic device, the intermediate elastic element expands and makes the corresponding locking claw to move outwards to the lock position. Inversely, when pressurized fluid is drawn out from the inner cavity of the intermediate elastic element by the fluid-dynamic device, the intermediate elastic element retracts thus making the corresponding locking claw to move inwards to the release position.

Another alternative embodiment is envisaged wherein the base structure of the quick connector may be shaped as the outer female member and the mooring interface is shaped as the inner male member, so that the base structure is configured to receive therein the mooring interface and to match it geometrically. Typically, these can be a conical geometry, spherical, or a combination of these.

BRIEF DESCRIPTION OF THE DRAWINGS

Preferred embodiments of the quick connector are described below with reference to the attached drawings, in which.

DETAILED DESCRIPTION OF PREFERRED EMBODIMENTS

Figure 1:
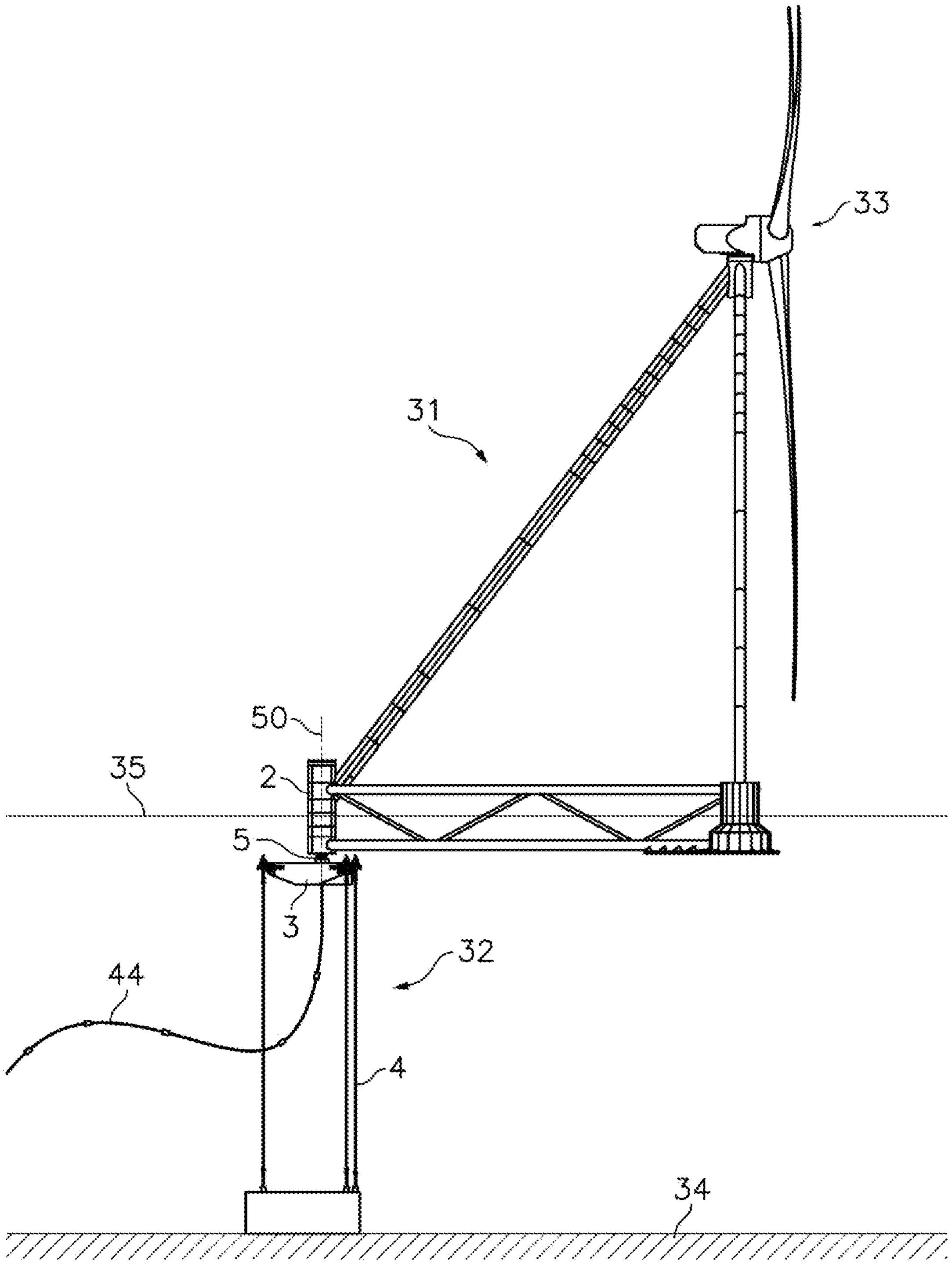
FIG. 1 is a diagrammatic side view of a quick connector coupling an offshore floating structure to a pre-laid mooring system according to an embodiment of the present invention.

Referring first to FIG. 1, reference sign 5 designates a quick connector for coupling an offshore floating structure 31 to a pre-laid mooring system 32 according to an embodiment of the present invention.

In the shown embodiment, the offshore floating structure 31 is configured as a weathervaning structure that supports a floating offshore wind turbine 33 and that comprises an upper body 2 partially submerged with respect to the mean water level 35, and the pre-laid mooring system 32 is configured as a tension leg platform type comprising a submerged floating lower body 3 linked to the seabed 34 by means of a plurality of mooring lines 4. However, it is noted that the particular configurations for the floating structure 31 and for the pre-laid mooring 32 system are merely illustrative and not limiting, since other configurations for the floating structure 31 and for the pre-laid mooring system 32 are compatible with the quick connector 5 of FIG. 1.

Referring to FIGS. 2 to 6, the quick connector 5 comprises a base structure 6 configured to be coupled to the upper body 2 of the offshore floating structure 31. In embodiments compatible with the embodiment of FIG. 2 the base structure may be coupled (preferably, rotatably coupled) by means of a yaw member 37 and a mooring interface 13 attached to the lower body 3 of the pre-laid mooring system. The quick connector 5 further comprises a locking mechanism which is fluid-dynamically actuated to couple and decouple the base structure 6 from the mooring interface 13 thereby the offshore floating structure 31 may be quickly coupled and decoupled from the pre-laid mooring system 32. For example, the locking mechanism is hydraulically or pneumatically actuated.

The base structure 6 is designed as an inner male member having a longitudinal axis 50 aligned with an axis about which the offshore floating structure 31 may weathervane, and the mooring interface 13 is configured as an outer female member configured to receive in a fit manner the base structure 6 therein. However, in some embodiments of the invention, this solution may be adapted to be used with base structure 6 configured as an outer female member configured to receive in a fit manner the mooring interface 13 configured as an inner male.

Figure 6:
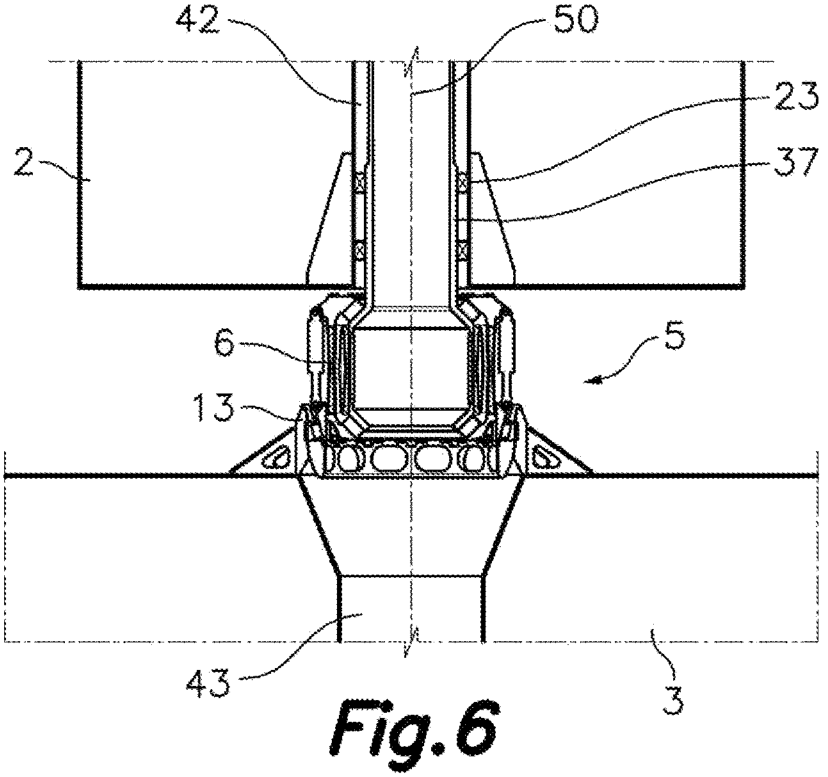
FIG. 6 is a diagrammatic side view of the quick connector coupling the offshore floating structure to the pre-laid mooring system together with a yaw system.

As better shown in FIG. 6, the base structure 6 is coupled to an optional yaw member 37 which is in turn rotatably coupled to a pass-through passage 42 of the upper body 2 of the offshore floating structure by bearings 23 coaxial to the longitudinal axis 50. The yaw member 37, the base structure 6 and the mooring interface 13 have a hollow interior, and the lower body 3 of the pre-laid mooring system has a pass-through passage 43 aligned with the longitudinal axis 50. An electric conductor line 44 (shown in FIG. 1) conducting electricity generated by the floating offshore wind turbine 33 is installed through the passage 43 of the lower body 3 and through the hollow interior of the yaw member 37, the base structure 6 and the mooring interface 13.

Figure 3:
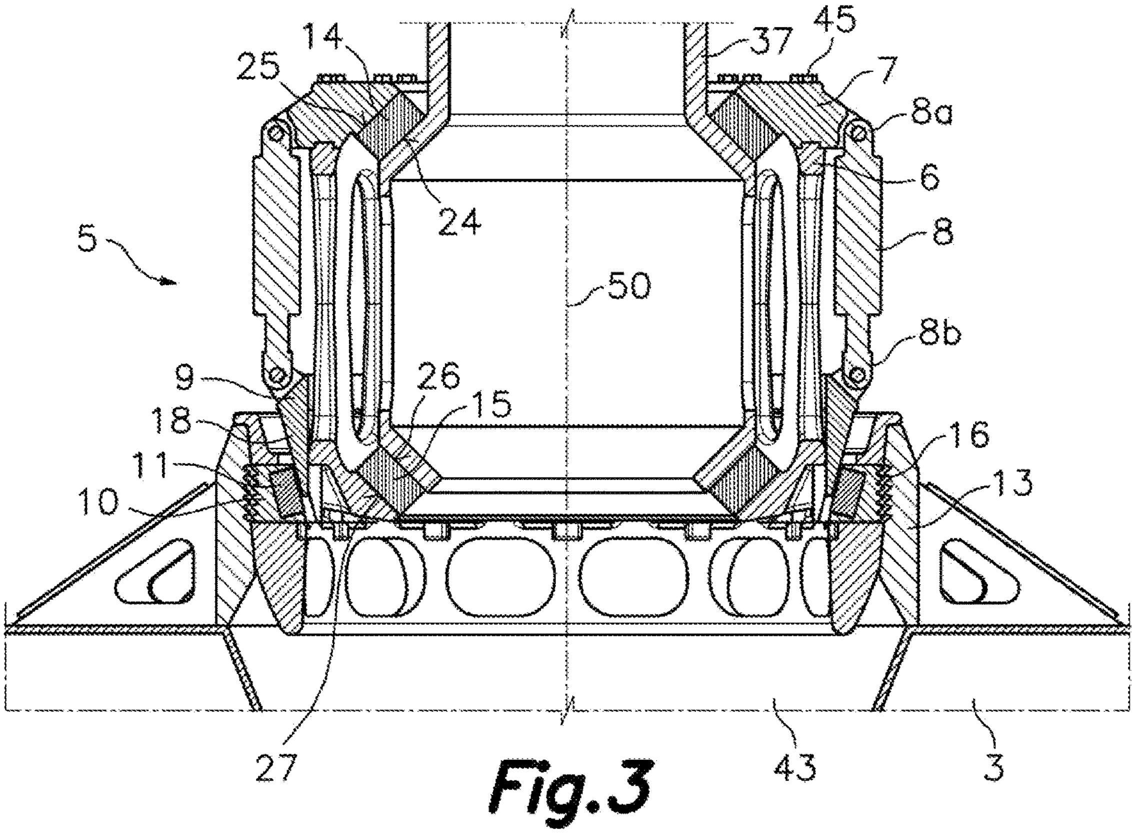
FIG. 3 is a cross-sectional view of the quick connector taken by a vertical medial plane, showing locking claws of a fluid-dynamically actuated locking mechanism in a release position.
Figure 4:
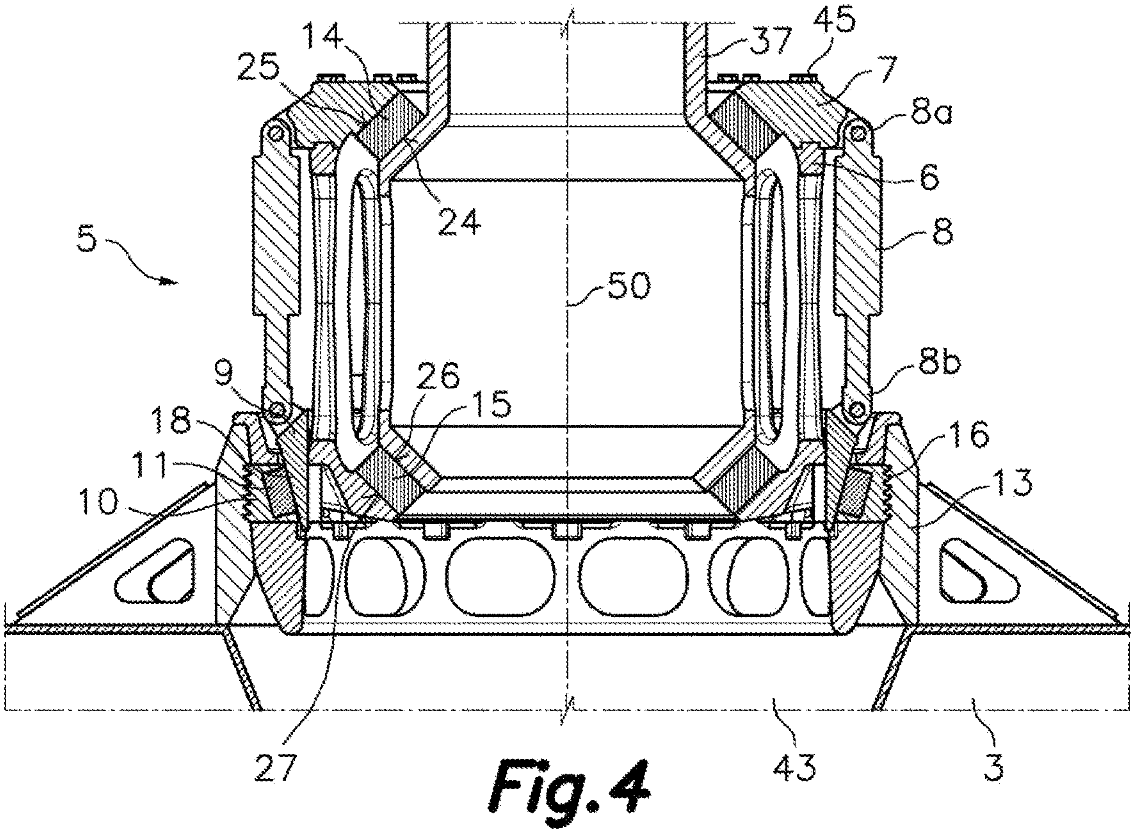
FIG. 4 is a cross-sectional view of the quick connector taken by a vertical medial plane, with the locking claws in a lock position.
Figure 5:
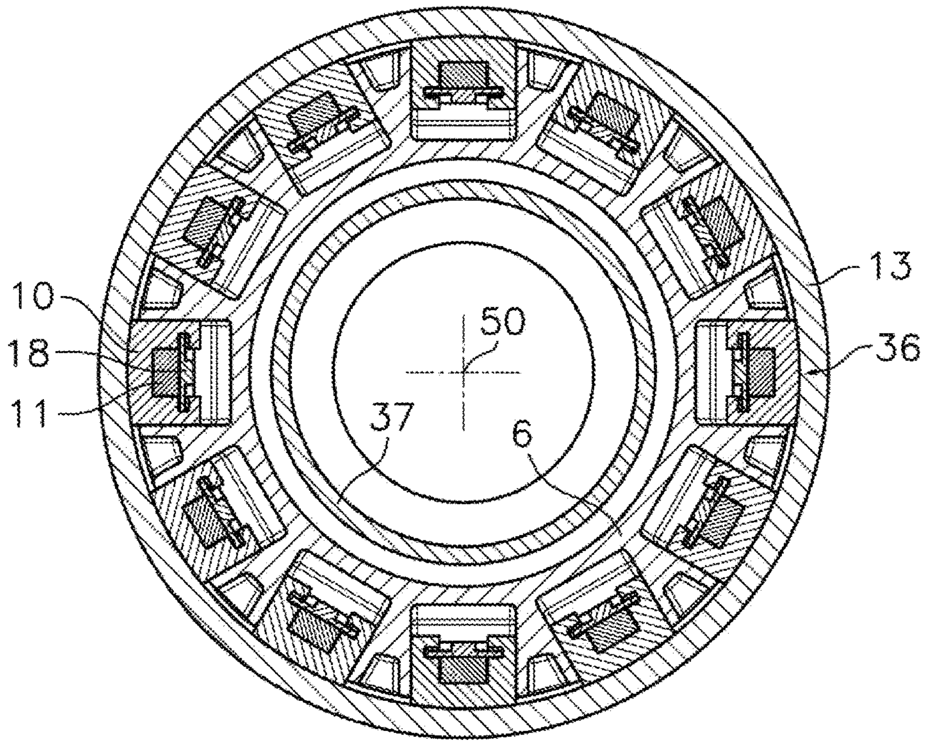
FIG. 5 is a cross-sectional view of the quick connector taken by a horizontal plane, showing a circumferential arrangement of the locking claws.

As shown in FIGS. 3 and 4, an optional collet 7 is arranged on top of the base structure 6 and connected thereto by screws 45. The yaw member 37 has a cylindrical portion coaxially arranged inside a cylindrical portion of the base structure 6 and elastic coupling elements 14, 15 are arranged between the yaw member 37 and the base structure 6, and also between the yaw member 37 and the collet 7. The elastic coupling elements 14, 15 include upper elastic coupling elements 14 and lower elastic coupling elements 15. The upper elastic coupling elements 14 are located between upper outer conical surfaces 24 of the yaw member 37 and upper inner conical surfaces 25 of the collet 7. The lower elastic coupling elements 15 are located between lower outer conical surfaces 26 of the yaw member 37 and lower inner conical surfaces 27 of the base structure 6. The upper outer and inner conical surfaces 24, 25 and the lower outer and inner conical surfaces 26, 27 are coaxial to the longitudinal axis 50 of the base structure 6 and have opposite cone or sphere angles.

Alternatively, upper outer and inner spherical surfaces and lower outer and inner spherical surfaces may be provided instead of the upper outer and inner conical surfaces 24, 25 and lower outer and inner conical surfaces 26, 27.

The locking mechanism comprises a plurality of locking assemblies 36 movably mounted on the base structure 6, radially arranged and distributed around the longitudinal axis 50. Each locking assembly 36 is guided to slide perpendicular (although in some compatible embodiments the sliding may be at least partially perpendicular) to the longitudinal axis 50 and includes a locking claw 10 having a plurality of locking ribs 10*a* facing outwards, wherein the locking ribs 10*a* are preferably configured as horizontal locking ribs 10*a*. The mooring interface 13 has a ring-shaped portion sized to receive therein a region of the base structure 6 where the locking assemblies 36 are mounted, and a grooved surface 16 having circumferential grooves is formed on an inner surface of the ring-shaped portion of the mooring interface 13.

The base structure 6 and the mooring interface 13 are configured so that once coupled together the locking assemblies 36 are arranged at a set height in which the locking ribs 10*a* of the locking claws 10 are facing the circumferential grooves of the grooved surface 16 formed in the mooring interface 13.

The locking mechanism further comprises a plurality of wedges 18 attached to an actuator ring 9 arranged around the base structure 6 and guided to move parallel (or at least partially parallel) to the longitudinal axis 50 and a plurality of hydraulic pistons 8 mounted on the base structure 6 and operatively connected to lower down and raise up the actuator ring 9 together with the wedges 18 attached thereto. In the shown embodiment, each hydraulic piston 8 has a first end 8*a* connected to the collet 7 and a second end 8*b* connected to the actuator ring 9.

Alternatively, the first end 8*a* of each wedge 18 may be connected to any other element of the base structure 6 and/or the second end 8*b* of each wedge 18 may be directly connected to one of the wedges 18 and the actuator ring 9 may be omitted.

Anyway, the hydraulic pistons 8 are operatively connected to lower down and raise up the wedges 18, and each wedge 18 has wedge surfaces 38, 39 configured and arranged to interact with inclined surfaces 17, 21, 22, 28, 30, 48 of one of the locking assemblies 36 so as to move outwards and inwards the locking claws 10 included in the locking assemblies 36 between a release position (shown in FIG. 3) in which the locking claws 10 are withdrawn from the grooved surface 16 of the mooring interface 13 and a lock position (shown in FIG. 4) in which the locking claws 10 are meshed with the grooved surface 16 of the mooring interface 13.

An intermediate actuator comprising an intermediate elastic element 11 is interposed between each wedge 18 and the locking claw 10 of the corresponding locking assembly 36. The intermediate elastic elements 11 may be selected with a given stiffness suitable to ensure that the locking claws 10 are pressed against the grooved surface 16 with a known force.

Figure 7:
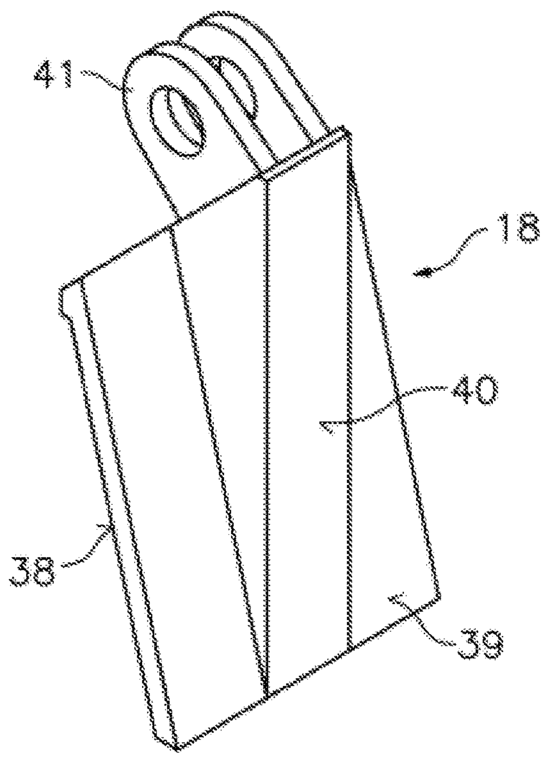
FIG. 7 is an isometric view of a wedge of the fluid-dynamically actuated locking mechanism according to some embodiments of the invention.

FIG. 7 shows an isolated view of one of the wedges 18 according to several embodiments of the invention for the sake of clarity in the drawing. The wedge 18 has an expansion wedge surface 38 facing outwards and a retraction wedge surface 39 facing inwards. The expansion wedge surface 38 and the retraction wedge surface 39 are mutually parallel. Optional lugs 41 are provided on top of the wedge 18 for connection to the second end 8*b* of the corresponding hydraulic piston 8 and a vertical guide surface 40 is formed on an inner side of the wedge 18.

FIG. 7 depicts a wedge configured as part comprising a main wedge body and a base plate. The base plate is configured to protrude laterally from the main wedge body, thereby forming two lateral wings. The expansion wedge surface 38 and the retraction wedge surface 39 are formed on the base plate (i.e., they are integral parts of the base plate), preferably as being mutually parallel. In preferred embodiments, the wedge is configured as a monobloc part comprising both the main wedge body and the base plate. The base plate of FIG. 7 is shown as comprising two lateral wings, so that the main wedge body is arranged centrally with respect to both wings. However, according to other embodiments, the base plate may comprise a single lateral wing, so that the main wedge body may be arranged laterally with respect to said single lateral wing.

Figure 8:
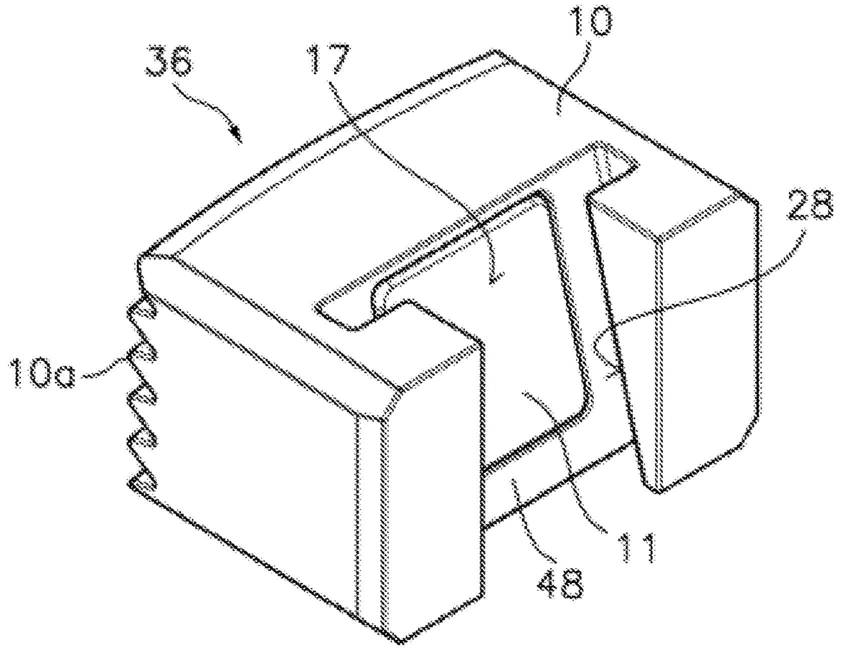
FIG. 8 is an isometric view of a locking assembly including the locking claw and an intermediate actuator.
Figure 10:
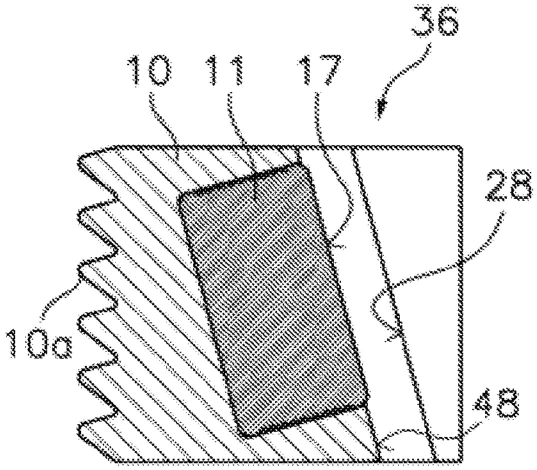
FIG. 10 is a cross-sectional view of a locking assembly, compatible with the embodiment depicted in FIG. 8, taken by a vertical medial plane, the locking assembly including the locking claw and an intermediate actuator comprising an intermediate elastic element.

FIGS. 8 and 10 show one of the locking assemblies 36 which comprises a locking claw 10 and an intermediate actuator comprising an intermediate elastic element 11. Indeed, in this particular configuration, the intermediate actuator only comprises an intermediate elastic element 11 (although the intermediate actuator may comprise one or more intermediate elastic elements 11), so that the intermediate actuator is configured as an intermediate elastic element 11. The locking assembly 36 comprises locking claw 10 with horizontal locking ribs 10*a* on an outer side thereof, expansion inclined surfaces 17, 48 and a retraction inclined surface 28 near an inner side. The expansion inclined surfaces 17, 48 and the retraction inclined surface are configured to form an inclined passage near an inner side. The inclined passage is configured to receive the expansion wedge surface 38 and the retraction wedge surface 39 of a wedge 18, preferably when these surfaces 38, 39 are formed on a base plate. The inclined passage may be configured as a slot. A cavity is formed in the locking claw 10 open in an outer side of the inclined passage and a retraction inclined surface 28 is formed on an inner side of the inclined passage. The cavity is formed in the locking claw 10 such that the cavity is accessible from the inclined passage. The inclined passage is open inwards in front of the cavity to allow the movement of the main wedge body when the base plate of the wedge slides within the inclined passage. The intermediate actuator comprising an intermediate elastic element 11 is housed in the cavity and has an expansion inclined surface 17 protruding into the inclined passage. Thus, it is noted that at least one of the expansion inclined surfaces 17 may be configured as an expansion inclined surface (or protruding expansion inclined surface 17) formed in the intermediate actuator. In particular, the protruding expansion inclined surface 17 may be configured to protrude into the inclined passage such that, when a wedge 18 is inserted into the inclined passage, the expansion wedge surface 38 of the wedge 18 comes into contact with the protruding expansion inclined surface 7.

The expansion inclined surface 17 and the retraction inclined surface 28 are preferably mutually parallel and parallel to the expansion wedge surface 38 and the retraction wedge surface 39 of the wedge 18. Further, the locking assembly 36 is shown as comprising an optional expansion inclined surface 48 (also referred to as secondary expansion inclined surface), which is configured such that, when the expansion wedge surface 38 interacts with the protruding expansion inclined surface 17 so that the intermediate elastic element 11 receives a predetermined compression force, then the secondary expansion inclined surface 48 comes into contact with the expansion wedge surface 38, the secondary expansion inclined surface 48 being preferably located on the locking claw 10. The secondary expansion inclined surface 48 may be configured as a surface arranged to at least partially surround the protruding expansion inclined surface 17. In some embodiments, the predetermined compression force may be selected to be greater than a range of operating compression forces of the quick connector under standard operating conditions. Thus, in such cases, the locking assembly 36 may be configured such that, contact between the secondary inclined surface 48 and the expansion wedge surface 38 may take place only when an extraordinary compression force is generated (e.g., due to a non-standard operation, such as in a failure situation), or when the intermediate actuator (e.g., the intermediate elastic element 11) is deteriorated. In these cases, the contact of the expansion wedge surface 38 with the inclined secondary surface 48 provides a distribution of forces over a larger surface area, thus reducing the stress concentration.

It is noted that the retraction inclined surface 28 shown in FIG. 8 may be interpreted as comprising two surfaces arranged on a same single plane, wherein each of these surfaces are arranged on a respective side of the inclined. The same duplicity may be applicable to the retraction wedge surface 39 shown in FIG. 7, wherein the said surface may be interpreted as comprising two independent surfaces. Therefore, in compatible embodiments, a wedge 18 may comprise one or more expansion wedge surfaces 38 and one or more retraction inclined surfaces 39, and a locking assembly 36 may comprise one or more expansion inclined surfaces 17, 21, 22, 48 and one or more retraction inclined surfaces 28, 30.

Figure 9:
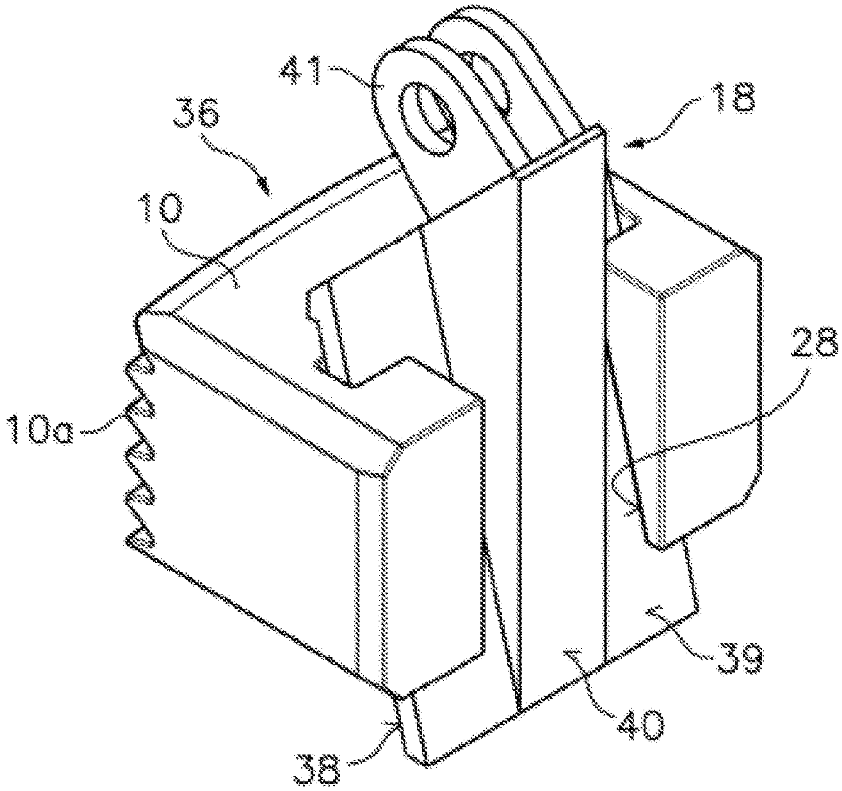
FIG. 9 is an isometric view of the wedge interacting with the locking assembly.

FIG. 9 shows a wedge 18 inserted into a locking assembly 36 compatible with any of the embodiments shown in FIGS. 7, 8, 10 and 11. FIG. 9 depicts a wedge 18 inserted in the inclined passage of the locking claw 10. The expansion wedge surface 38 of the wedge 18 is configured and arranged to interact with one or more of the expansion inclined surfaces 17, 21, 48, and the retraction wedge surface 39 of the wedge 18 is configured and arranged to interact with the retraction inclined surface 28 of the locking claw 10.

The inclined surfaces 17, 21, 28 and the wedge surfaces 38, 39 are configured so that when the wedge 18 is impelled by the hydraulic piston 8 to perform a vertical movement towards an expansion direction, which in this embodiment is a downwards movement, the wedge 18 makes the intermediate elastic element 11 together with the locking claw 10 to move outwards to the lock position, and when the wedge 18 is impelled by the hydraulic piston 8 to perform a vertical movement towards a retraction direction, which in this embodiment is an upwards movement, the wedge 18 makes the locking claw 10 together with the intermediate elastic element 11 to move outwards to the lock position.

Figure 11:
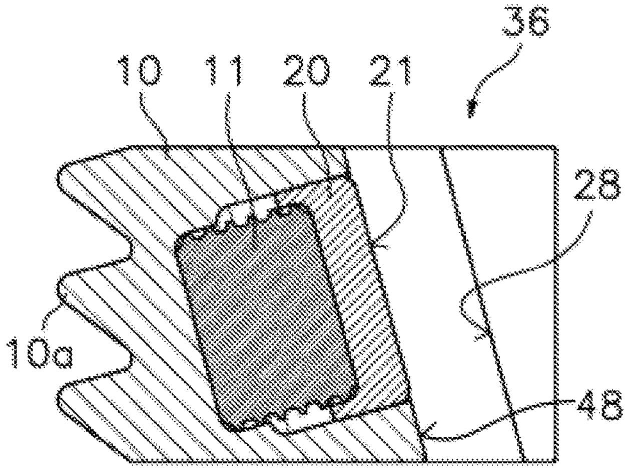
FIG. 11 is a cross-sectional view of a locking assembly according to another embodiment, compatible with the solution depicted in FIG. 8, taken by a vertical medial plane, the locking assembly including the locking claw and an intermediate actuator comprising a push element and an intermediate elastic element.

FIG. 11 shows a locking assembly 36 according to another embodiment which only differs from the one described above with reference to FIGS. 8 and 10 in that the intermediate actuator further comprises a push element 20 coupled to the intermediate elastic element 11 at an inner side thereof, such that the protruding expansion inclined surface 21 is now included in the push element 11. Thus, the push element 20 has an expansion inclined surface 21 protruding into the inclined passage of the locking claw 10. In this embodiment, the wedge 18 interacts with the locking assembly 36 as explained above with reference to FIG. 9 with the difference that here the expansion wedge surface 38 of the wedge 18 is configured and arranged to interact with the expansion inclined surface 21 of the push element 20.

The embodiment of FIG. 11 further shows that the push element 20 is configured to have a wider cross-section area than the intermediate elastic element 11, such that the push element 20 is configured to embrace a first end of the intermediate elastic element 11, and wherein the cavity of the respective locking claw 10 in which the intermediate actuator is housed comprises a lateral wall, wherein at least a part of said lateral wall is configured to provide sliding contact with the push element 20 but not with the at least one intermediate elastic element 11 (i.e., the referred part of the wall is spaced apart from the elastic element 11). This is an optional feature of the embodiment. Thereby, a space is created between the intermediate elastic element and the part of the lateral wall configured to provide sliding contact with the push element, such that the friction between the cavity the lateral wall of the cavity and the intermediate elastic element is notably reduced. In the embodiment of FIG. 11, the intermediate elastic element 11 is configured with optional lateral ribs, which provide an additional structural rigidity to the intermediate elastic element, thereby ensuring a stable lineal compression of this element, even on those areas of the intermediate elastic element 11 that are spaced apart from the lateral wall of the cavity, therefore lacking lateral contact during the compression of the intermediate elastic element 11.

Further, the embodiments shown in FIGS. 10 and 11 show respective intermediate actuators arranged with an angle of inclination with respect to a direction perpendicular to the longitudinal axis 50, said angle of inclination being configured such that, when the intermediate actuator receives a compression force from the respective wedge 18, the intermediate actuator transmits a primary part (i.e. more than the 50% of the force) of the force in a direction perpendicular to the longitudinal axis 50 and secondary part (i.e., less than the 50% of the force) of the force in a direction parallel to the longitudinal axis 50 according to (i.e., aligned with) the movement of the wedge 18. The angle of inclination is an optional feature that ensures that the locking claws 10 engage with the respective grooved surface 16 in the locking position, while providing a transversal force (i.e., parallel to the longitudinal axis 50) that provides a pretensioning force in the connection between the base structure 6 and the mooring interface, while helping to connect the locking ribs 10*a* of the locking claws 10 with the grooved surface 16. This last effect is especially important when the locking ribs 10*a* are configured in a tooth-shaped pattern, and is even more especially important when said tooth-shaped pattern having a leaning towards a direction contrary to a direction of connection of the base structure 6 with the mooring interface 13 along the longitudinal axis 50. In other embodiments, the intermediate actuators may be arranged perpendicular to the longitudinal axis.

It is noted that the embodiment of FIG. 8 is also representative of the configuration shown in FIG. 11 when the reference sign 17 is replaced by the reference sign 21, and when the reference sign 11 is replaced by the reference sign 20. Thus, the protruding expansion inclined surface 17 of FIG. 8 may be interpreted as being representative of the protruding expansion inclined surface 21 of FIG. 11, while the intermediate elastic element 11 shown in FIG. 8 may be interpreted as being representative of the push element 20 of FIG. 11 (the intermediate elastic element would be behind the push element 20 in this view, thereby not being visible).

Figure 12:
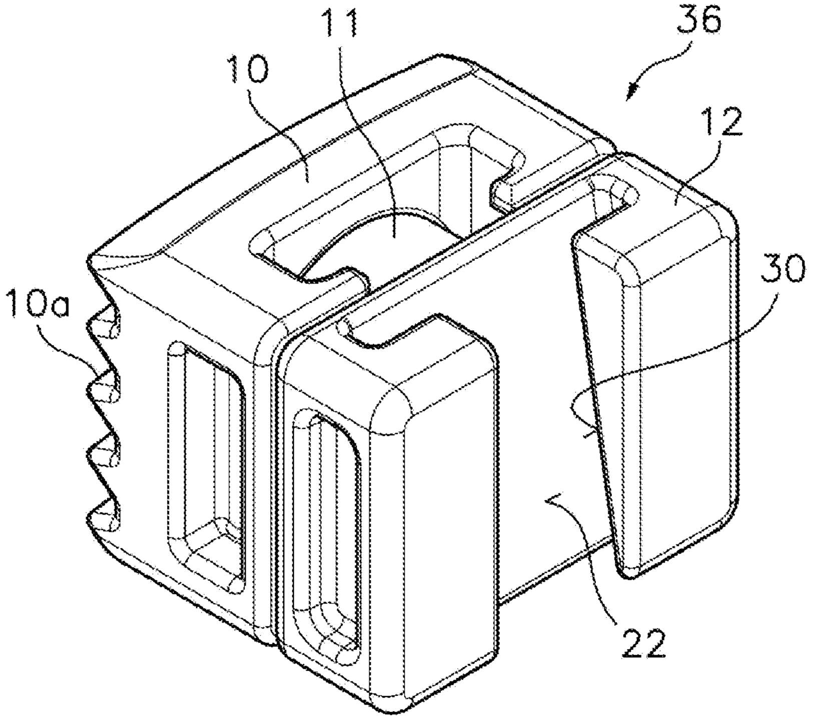
FIG. 12 is an isometric view of a locking assembly according to still another embodiment, the locking assembly including the locking claw, an inner support, and an intermediate actuator comprising an intermediate elastic element.
Figure 13:
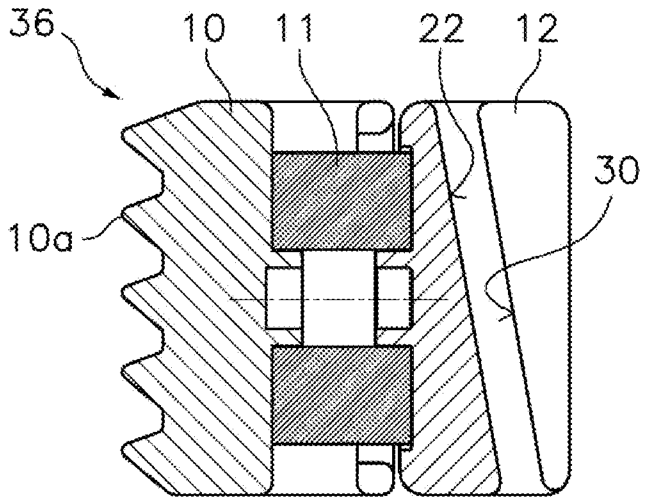
FIG. 13 is a cross-sectional view of the locking assembly of FIG. 12 taken by a vertical medial plane.

FIGS. 12 and 13 show a locking assembly 36 according to still another embodiment which comprises the locking claw 10, the intermediate actuator with the intermediate elastic element 11 and an inner support 12, wherein the locking claw 10 is linked at the inner side thereof to the inner support 12 and the intermediate actuator having the intermediate elastic elements 11 is interposed between the locking claw 10 and the inner support 12. In this embodiment, the at least one expansion inclined surface 22 and the at least one retraction inclined surface 30 are arranged on the inner support forming an inclined passage near an inner side thereof. The inclined passage is open inwards with respect to the base structure 6 (in the same way as disclosed for the embodiment of FIG. 8) and defines an expansion inclined surface 22 and a retraction inclined surface 30.

The locking assembly 36 of FIGS. 12 and 13 is configured to interact with the wedge 18 of FIG. 7. The expansion inclined surface 22 and the retraction inclined surface 30 are mutually parallel and parallel to the expansion wedge surface 38 and the retraction wedge surface 39 of the wedge 18. The expansion wedge surface 38 of the wedge 18 is configured and arranged to interact with the expansion inclined surface 22 of the inner support 12 in order to cause an outwards movement of the locking assembly 36 to the lock position and the retraction wedge surface 39 of the wedge 18 is configured and arranged to interact with the retraction inclined surface 30 of the inner support in order to cause an inwards movement of the locking assembly 36 to the release position.

Figure 14:
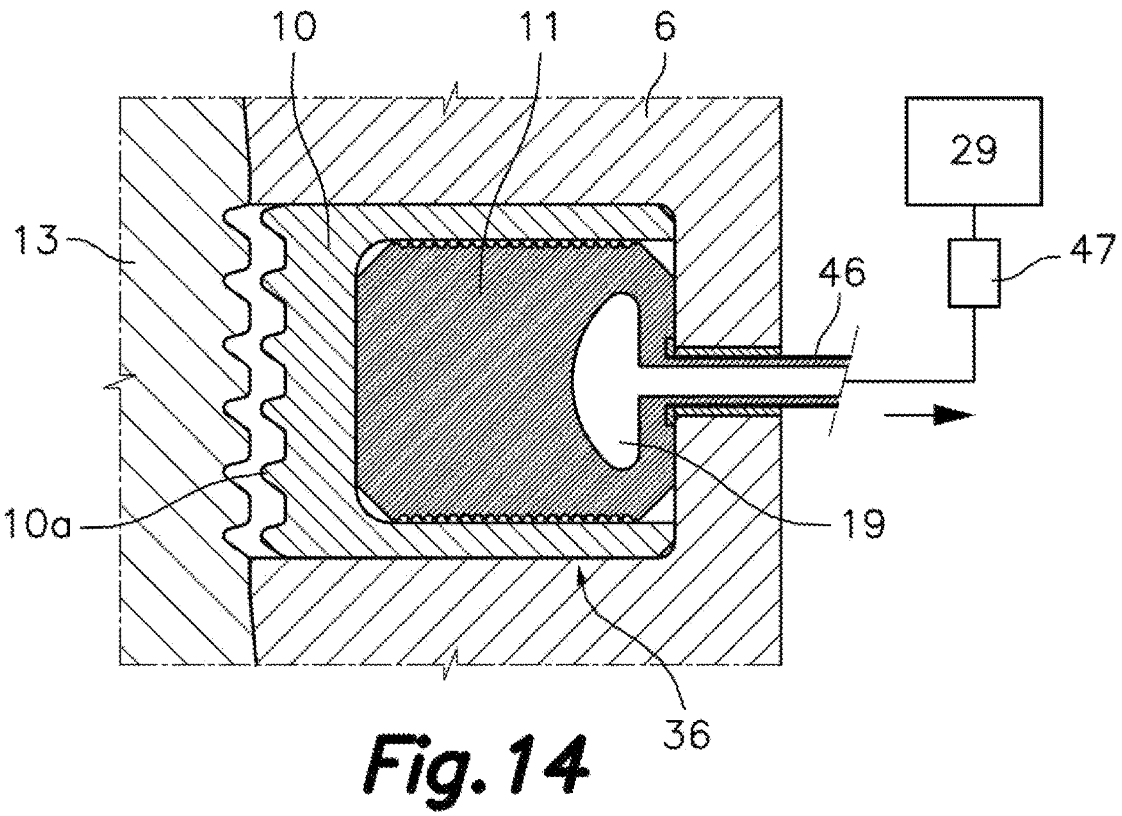
FIG. 14 is a cross-sectional view of a fluid-dynamically actuated locking mechanism and a locking assembly according to a further embodiment taken by a vertical medial plane, the locking assembly including the locking claw and an extensible and retractable intermediate elastic element, showing the locking claw in the release position.
Figure 15:
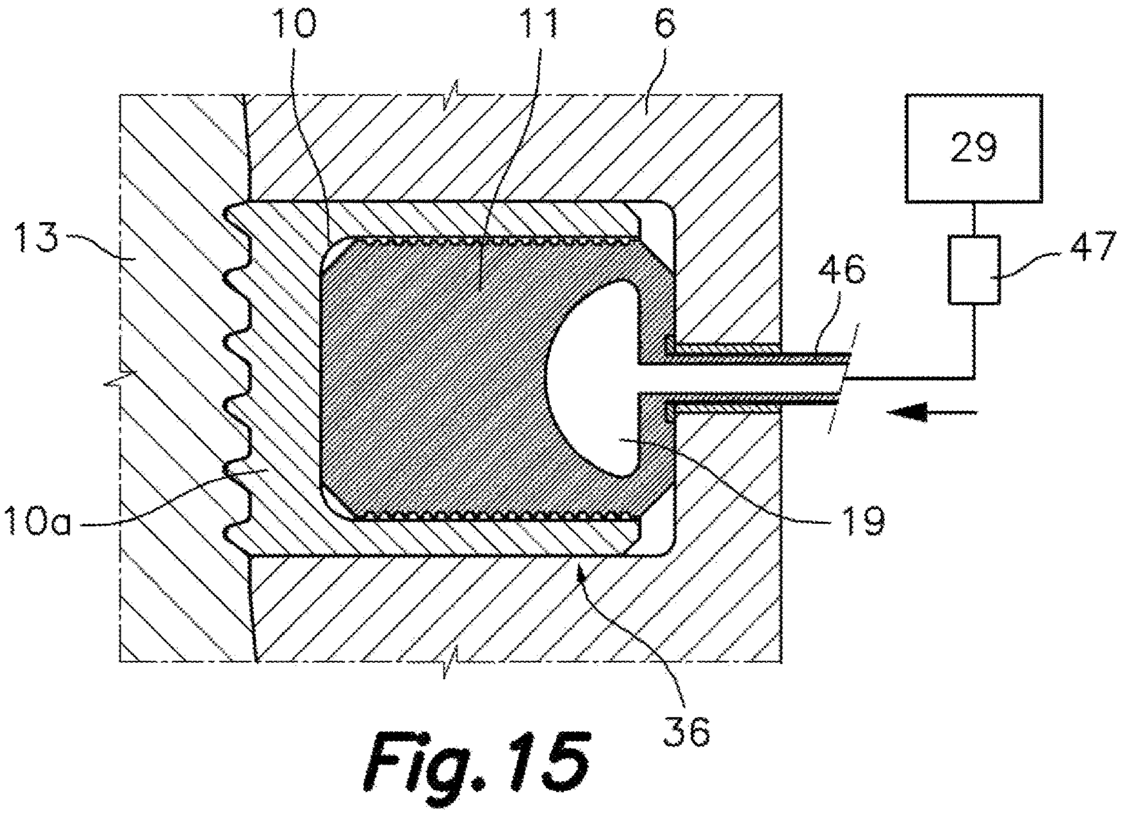
FIG. 15 is a cross-sectional view analogous to FIG. 14 but showing the locking claw in the lock position.

FIGS. 14 and 15 show a fluid-dynamically actuated locking mechanism and a locking assembly 36 according to still another embodiment. Each locking assembly 36 is guided with respect to the base structure 6 to slide perpendicular, or at least partially perpendicular, to the longitudinal axis 50 and comprises a locking claw 10 and an intermediate elastic element 11 which in this embodiment is interposed between each locking claw 10 and the base structure 6. Each intermediate elastic element 11 is fluid-dynamically expansible and retractable by actuation of the fluid-dynamic device.

More specifically, as shown in FIGS. 14 and 15, the intermediate elastic element 11 has an inner cavity 19 and the fluid-dynamic device comprises a source of pressurized fluid 29, a valve arrangement 47, and a fluid conduit 46. The inner cavity 19 of the intermediate elastic element 11 is in fluid communication with the source of pressurized fluid 29 through the fluid conduit 46 and through the valve arrangement 47.

In the situation shown in FIG. 14, the valve arrangement 47 is set to allow pressurized fluid to be exhausted from the inner cavity 19 of the intermediate elastic element 11 through the fluid conduit 46 (as shown by an arrow) thereby the intermediate elastic element 11 retracts and pulls the locking claw 10 inwards to the release position.

In the situation shown in FIG. 15, the valve arrangement 47 is set to allow pressurized fluid from the source of pressurized fluid 29 to be injected to the inner cavity 19 of the intermediate elastic element 11 through the fluid conduit 46 (as shown by an arrow) thereby the intermediate elastic element 11 expands and pushes the locking claw 10 outwards to the lock position.

In summary, in one embodiment of the present invention shown in FIGS. 2 to 13, the quick connector 5 coupling an offshore floating structure to a pre-laid mooring system comprises the base structure 6, being preferably configured as a cone that holds the circumferentially arranged locking assemblies 36, and a cylinder that configured to keep the locking mechanism at a set height. A collet 7 preferably sits on top of the base structure 6 cylinder and is attached to the hydraulic pistons 8 of the fluid-dynamic device that connect the collet 7 to the actuator ring 9, which is located outside of the base structure 6 cylinder. The elastic coupling elements 14 serve as an intermediate element between inner walls of the base structure 6 cylinder and the collet 7 and the yaw member 37 that is designed to be inserted into the base structure 6 of the quick connector. The main purpose of the elastic coupling elements 14 is to allow a limited relative motion and rotation between the yaw member 37 and the mooring interface 13, resisting all other load components. It is also there to improve the self-alignment of the structure and protect it from possible impacts during the installation process.

The locking assemblies 36 sit within the base structure 6 cone and each consists of several parts such as: in one embodiment, a locking claw 10 and an intermediate elastic element 11; in another embodiment, a locking claw 10, an intermediate elastic element 11 and a push element 20; in still another embodiment, a locking claw 10, an intermediate elastic element 11 and an inner support 12. Since the two or three parts fit together geometrically as described with reference to FIGS. 8-13, they are held together tightly at all times.

The actuator ring 9 has a set of wedges 18, with each of them piercing the corresponding intermediate elastic element 11 or inner support 12 through the socket designed to match its shape. The released state of the quick connector, described with reference to FIG. 3, shows the wedges 18 of the actuator ring 9 only partially inserted into the inner supports 12 to keep the locking claws retracted.

Once the base structure 6 of the quick connector 5 is guided into the receiving portion of the mooring interface 13, with the longitudinal axis 50 of the base structure 6 in alignment with the vertical axis of the mooring interface 13, and the base structure 6 is located at the set height in the mooring interface 13, pistons 8 are actuated until lowering down the actuator ring 9, thereby inserting the wedges 18 attached to the actuator ring 9 all the way down into the locking claws 10 or into the inner supports 12 linked to the locking claws 10, depending on the embodiment. In so doing, the wedges 18 are pressed down on the intermediate elastic elements 11 or on the push elements connected to the intermediate elastic elements 11, depending on the embodiment, thus driving the locking claws 10 away from the longitudinal axis 50 and out of the base structure 6 to the lock position. This makes the locking claws 10 to press against the inner grooved surface 16 of the mooring interface 13, as described above with reference to FIG. 4, thereby coupling the male portion of base structure 6 to the female portion of the mooring interface 13 and thus connecting the upper body 2 of the offshore floating structure to the lower body 3 of the pre-laid mooring system.

Figure 2:
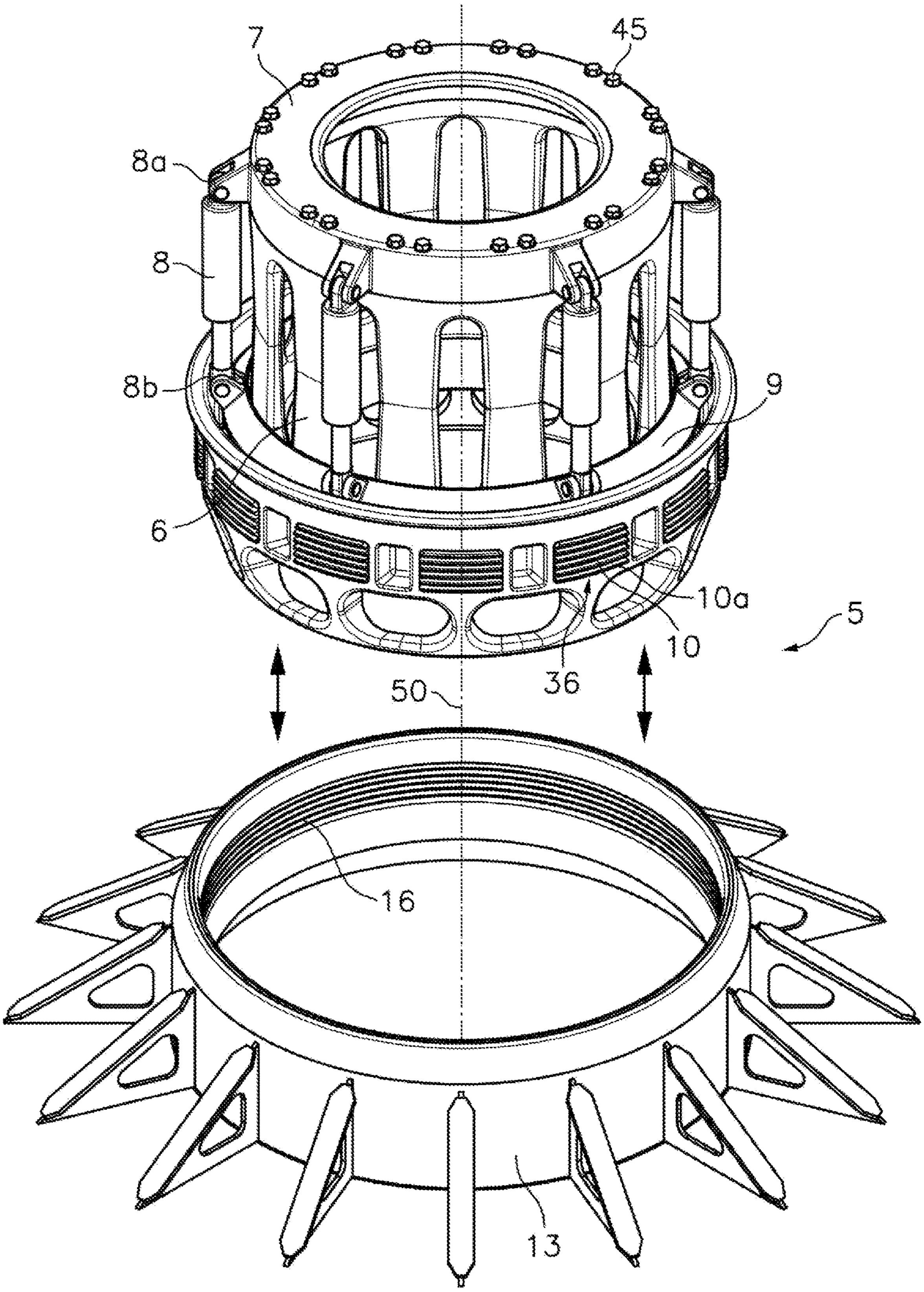
FIG. 2 is an exploded isometric view of a quick connector according to embodiments of the invention.

It is worth noting that, in the embodiment shown in FIGS. 2, 3 and 4, only two of the hydraulic pistons 8 are strictly required to actuate the locking mechanism of the quick connector 5. Thus, when more than two pistons are included, it is firstly to provide a more equally distributed force in the collet 7 and in the actuator ring 9, and secondly as a redundancy measure, where for example the system has four or more pistons in two independent hydraulic systems, if one of the hydraulic systems fails there is still another fully operative hydraulic system to provide even loading to the collet and to the actuator ring 9.

Different stages in a coupling method or manoeuvre for coupling an offshore floating structure to a pre-laid mooring system by using the quick connector according to the embodiment of the present invention shown in FIGS. 1 to 23 are as follows:

Stage 1—The base structure 6 of the quick connector is guided into the receiving portion of the mooring interface 13.

Stage 2—The base structure 6 is fully aligned with the mooring interface 13 and positioned at a set height but the base structure 6 and the mooring interface 13 are not locked together due to the release position of the locking claws 10.

Stage 3—The hydraulic pistons 8 of the quick connector 5 are actuated thereby the locking claws 10 in the base structure 6 are moved to the lock position and pressed against the grooved surface 16 of the mooring interface 13, thus fixing the base structure 6, which is coupled to the upper body 2 of the offshore floating structure, to the mooring interface 13, which is attached to the lower body 3 of the pre-laid mooring system.

A decoupling method or manoeuvre for decoupling the offshore floating structure from the pre-laid mooring system by using the quick connector of the present invention comprises performing the stages above in a reverse manner.

In another embodiment of the present invention shown in FIGS. 14 and 15, the quick connector 5 coupling an offshore floating structure to a pre-laid mooring system comprises locking assemblies 36 guided with respect to the base structure 6 to slide perpendicular to the longitudinal axis 50, and each locking assembly 36 comprises a locking claw 10 and a fluid-dynamically expansible and retractable intermediate elastic element 11 interposed between the locking claw 10 and the base structure 6. The fluid-dynamic device is configured to inject pressurized fluid to an inner cavity 19 of each intermediate elastic element 11 so as to expand it and move the corresponding locking claw 10 outwards to the lock position, or to draw out pressurized fluid from the inner cavity 19 of each intermediate elastic element 11 so as to retract it and move the corresponding locking claw 10 inwards to the release position.

The stages in a coupling and decoupling method by using the quick connector according to the embodiment shown in FIGS. 14 and 15 are the same as in the previous embodiment but operating the fluid-dynamic device so as to expand and retract the intermediate elastic elements 11 for moving the locking claws 10 outwards and inwards between the lock and release positions instead of operating the hydraulic pistons 8 for moving the actuator ring 9 and wedges 18 upwards and downwards.

The invention claimed is:

1. A quick connector for coupling, in alignment with a longitudinal axis, an offshore floating structure to a pre-laid mooring system, the quick connector comprising:

a base structure configured to be coupled to an upper body of the offshore floating structure;

a mooring interface configured to be attached to a lower body of the pre-laid mooring system; and a locking mechanism fluid-dynamically actuated to couple and decouple the base structure from the mooring interface, wherein the locking mechanism comprises:

a grooved surface formed in the mooring interface;

locking claws movably mounted on the base structure; and a fluid-dynamic device associated to the base structure and operatively connected to move the locking claws between a release position in which the locking claws are withdrawn from the grooved surface of the mooring interface and a lock position in which the locking claws are meshed with the grooved surface of the mooring interface;

wherein each locking claw is included in a respective locking assembly and is guided to slide at least partially perpendicular to the longitudinal axis, each locking assembly comprising at least one expansion inclined surface and at least one retraction inclined surface;

wherein the quick connector further comprises a plurality of wedges distributed around the longitudinal axis and configured to be mounted to the base structure so as to move at least partially parallel to the longitudinal axis, each wedge of the plurality of wedges being associated with a respective one of the locking assemblies and comprising at least one expansion wedge surface and at least one retraction wedge surface;

wherein the fluid-dynamic device is operatively connected to lower down and raise up the plurality of wedges; and wherein, for each wedge of the plurality of wedges and the locking assembly associated therewith, the at least one expansion wedge surface of said wedge is configured and arranged to interact with the at least one expansion inclined surface of said associated locking assembly so as to move the locking claw of said associated locking assembly towards the lock position, and the at least one retraction wedge surface of said wedge is configured and arranged to interact with the at least one retraction inclined surface of said associated locking assembly so as to move the locking claw of said associated locking assembly towards the release position.

2. The quick connector according to claim 1, wherein the locking claws are radially arranged, distributed around the longitudinal axis and facing towards the grooved surface wherein the mooring interface has a ring shaped portion sized to coaxially connect therein a region of the base structure where the locking claws are mounted, and the grooved surface is formed on a surface of the ring shaped portion of the mooring interface facing towards the locking claws.

3. The quick connector according to claim 1, wherein each of the locking claws comprises a plurality of locking ribs configured to engage with the grooved surface.

4. The quick connector according to claim 3, wherein the locking ribs are configured to define a tooth-shaped pattern, and wherein the tooth-shaped pattern is configured to have an inclination such that the tooth-shaped pattern leans towards a direction contrary to a direction of connection of the base structure with the mooring interface along the longitudinal axis.

5. The quick connector according to claim 1, wherein each wedge is configured as a part comprising a main wedge body and a base plate; wherein the base plate protrudes laterally from the main wedge body, thereby forming one or two lateral wings, the expansion and retraction wedge surfaces being respectively configured as opposing faces of the base plate; and wherein the expansion and retraction inclined surfaces of each locking assembly are configured to form an inclined passage configured to receive the base plate of a respective wedge.

6. The quick connector according to claim 5, wherein each locking assembly further comprises an intermediate actuator comprising at least one intermediate elastic element; wherein each intermediate actuator is arranged between each wedge and each locking claw of the corresponding locking assembly; and wherein each intermediate actuator is configured such that, when the base plate of the respective wedge slides within the inclined passage of the respective locking assembly, then the intermediate actuator receives a compression force causing the intermediate actuator to push the locking claws, thereby causing the locking claws to mesh with the grooved surface of the mooring interface in the lock position.

7. The quick connector according to claim 6, wherein each intermediate actuator is arranged in a direction perpendicular to the longitudinal axis or is arranged with an angle of inclination with respect to a direction perpendicular to the longitudinal axis.

8. The quick connector according to claim 6, wherein each intermediate actuator is at least partially housed in a cavity of the corresponding locking claw; wherein one of the at least one expansion inclined surface of the locking assembly is configured as a protruding expansion inclined surface, the protruding expansion inclined surface being an integral part of the intermediate actuator and being configured to protrude from the cavity to come into contact with the at least one expansion wedge surface of the wedge; wherein the at least one expansion wedge surface is configured to interact with the protruding expansion inclined surface of the intermediate actuator so as to cause a movement of the at least one intermediate elastic element together with the locking claw to the lock position as a result of a movement of the wedge towards an expansion direction; and wherein the at least one retraction wedge surface is configured to interact with the at least one retraction inclined surface of the locking assembly so as to cause a movement of the locking claw together with the at least one intermediate elastic element to the release position as a result of a movement of the wedge towards a retraction direction.

9. The quick connector according to claim 8, wherein the at least one expansion inclined surface comprises a secondary expansion inclined surface configured such that, when the at least one expansion wedge surface interacts with the protruding expansion inclined surface so that the at least one intermediate elastic element receives a predetermined compression force, then the secondary expansion inclined surface comes into contact with the at least one expansion wedge surface.

10. The quick connector according to claim 8, wherein the protruding expansion inclined surface is an integral part of the intermediate elastic element; or wherein each intermediate actuator further comprises a push element coupled to the at least one intermediate elastic element, such that the protruding expansion inclined surface is part of the push element.

11. The quick connector according to claim 6, wherein each locking assembly further comprises an inner support linked to the respective locking claw; wherein the at least one expansion inclined surface and the at least one retraction inclined surface are arranged on the inner support; wherein the intermediate actuator comprising at least one intermediate elastic element is arranged as a linking element between each locking claw and the corresponding inner support; wherein the at least one expansion wedge surface is configured to interact with the at least one expansion inclined surface of the inner support so as to cause a movement of the inner support together with the at least one intermediate elastic element and the locking claw to the lock position as a result of a movement of the wedge towards an expansion direction; and wherein the at least one retraction wedge surface is configured to interact with the at least one retraction inclined surface of the inner support so as to cause a movement of the inner support together with the at least one intermediate elastic element and the locking claw to the release position as a result of a movement of the wedge towards a retraction direction.

12. The quick connector according to claim 1, wherein the wedges are attached to an actuator ring arranged around the base structure and guided to move parallel to the longitudinal axis, and the fluid-dynamic device is arranged to move the actuator ring.

13. The quick connector according to claim 12, wherein the fluid-dynamic device comprises fluid-dynamically actuated pistons, wherein the quick connector further comprises a collet arranged and attached on top of the base structure, and wherein each fluid-dynamically actuated piston has a first end connected to the collet and a second end connected to the actuator ring.

14. The quick connector according to claim 1, wherein the quick connector is configured such that the offshore floating structure is enabled to weathervane about the longitudinal axis.

15. The quick connector according to claim 1, wherein, for each wedge of the plurality of wedges and the locking assembly associated therewith, the at least one expansion wedge surface is configured to directly contact the at least one expansion inclined surface to move the locking claw toward the lock position, and the at least one retraction wedge surface is configured to directly contact the at least one retraction inclined surface to move the locking claw toward the release position.

16. A method for coupling an offshore floating structure to a pre-laid mooring system by using the quick connector according to claim 1, the method comprising the following steps:

guiding the base structure, which is coupled to the upper body of the offshore floating structure, into the mooring interface, which is attached to the lower body of the pre-laid mooring system, with the locking claws in the base structure being kept at the release position;

fully aligning the longitudinal axis of the base structure with the mooring interface and positioning the base structure at a set height in which the locking claws are facing the grooved surface of the mooring interface while the locking claws are still kept at the release position; and moving the locking claws to the lock position by actuating the fluid-dynamic device until the locking claws are meshed with the grooved surface of the mooring interface, thus fixing the base structure to the mooring interface and thereby the upper body of the offshore floating structure is coupled to the lower body of the pre-laid mooring system.

17. A quick connector for coupling, in alignment with a longitudinal axis, an offshore floating structure to a pre-laid mooring system, the quick connector comprising:

a base structure configured to be coupled to an upper body of the offshore floating structure;

a mooring interface configured to be attached to a lower body of the pre-laid mooring system;

a locking mechanism fluid-dynamically actuated to couple and decouple the base structure from the mooring interface;

a yaw member;

bearings configured to be arranged coaxial to the longitudinal axis; and a collet configured to be arranged and attached on top of the base structure;

wherein the locking mechanism comprises:

a grooved surface formed in the mooring interface;

locking claws movably mounted on the base structure; and a fluid-dynamic device associated to the base structure and operatively connected to move the locking claws between a release position in which the locking claws are withdrawn from the grooved surface of the mooring interface and a lock position in which the locking claws are meshed with the grooved surface of the mooring interface;

wherein the quick connector is configured such that the offshore floating structure is enabled to weathervane about the longitudinal axis;

wherein the yaw member has a cylindrical portion configured to be coaxially arranged inside a cylindrical portion of the base structure; and wherein elastic coupling elements are arranged between the yaw member and the base structure and/or between the yaw member and the collet.

18. The quick connector according to claim 17, wherein the elastic coupling elements include upper elastic coupling elements and lower elastic coupling elements; wherein the upper elastic coupling elements are located between upper outer conical or spherical surfaces of the yaw member and upper inner conical or spherical surfaces of the collet; wherein the lower elastic coupling elements are located between lower outer conical or spherical surfaces of the yaw member and lower inner conical or spherical surfaces of the base structure; and wherein the upper outer and inner conical or spherical surfaces and the lower outer and inner conical or spherical surfaces are coaxial to the longitudinal axis and have opposite cone or sphere angles.

19. A quick connector for coupling, in alignment with a longitudinal axis, an offshore floating structure to a pre-laid mooring system, the quick connector comprising:

a base structure configured to be coupled to an upper body of the offshore floating structure;

a mooring interface configured to be attached to a lower body of the pre-laid mooring system;

a locking mechanism fluid-dynamically actuated to couple and decouple the base structure from the mooring interface;

a yaw member;

bearings configured to be arranged coaxial to the longitudinal axis; and a collet configured to be arranged and attached on top of the base structure, wherein the locking mechanism comprises:

a grooved surface formed in the mooring interface;

locking claws movably mounted on the base structure; and a fluid-dynamic device associated to the base structure and operatively connected to move the locking claws between a release position in which the locking claws are withdrawn from the grooved surface of the mooring interface and a lock position in which the locking claws are meshed with the grooved surface of the mooring interface;

wherein the base structure is configured to be coupled to the yaw member, and the yaw member is configured to be rotatably coupled to the upper body of the offshore floating structure by the bearings arranged coaxial to the longitudinal axis, thereby configuring the offshore floating structure to weathervane about the longitudinal axis; and wherein the yaw member has a cylindrical portion configured to be coaxially arranged inside a cylindrical portion of the base structure; and wherein elastic coupling elements are arranged between the yaw member and the base structure and/or between the yaw member and the collet.

* * * * *